W. LIKE.
ICE CREAM CONE FILLER.
APPLICATION FILED NOV. 13, 1915.
1,204,167.  Patented Nov. 7, 1916.
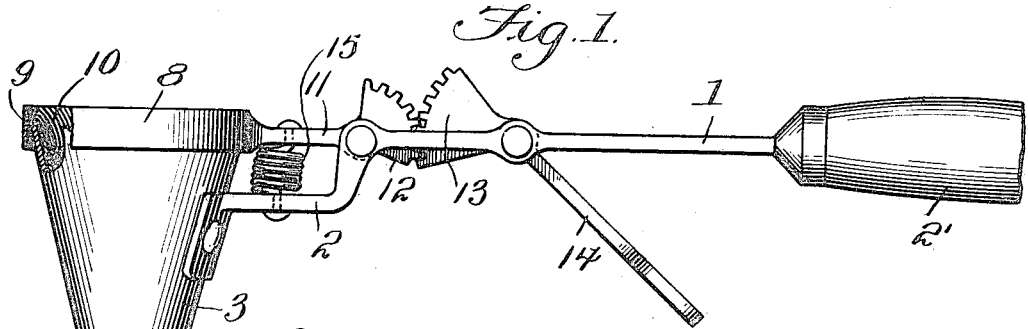
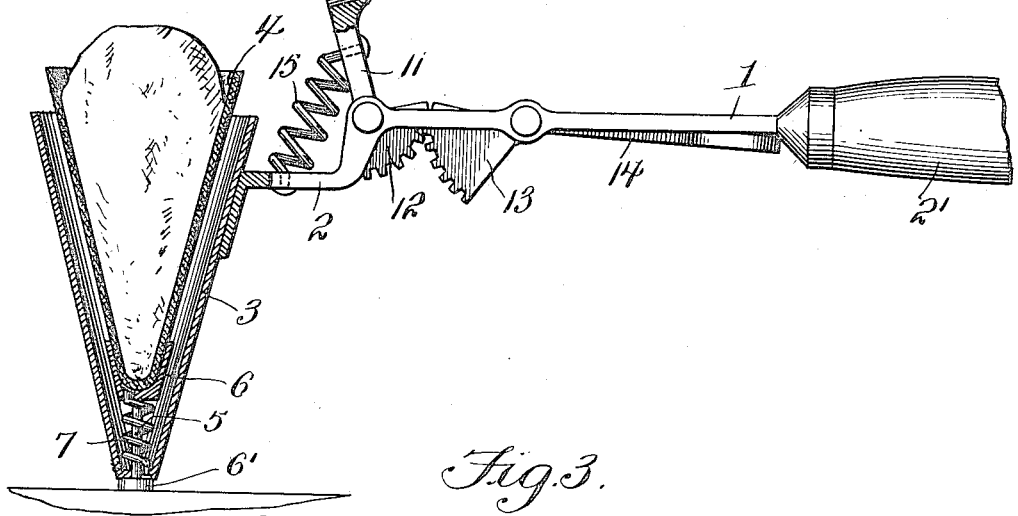
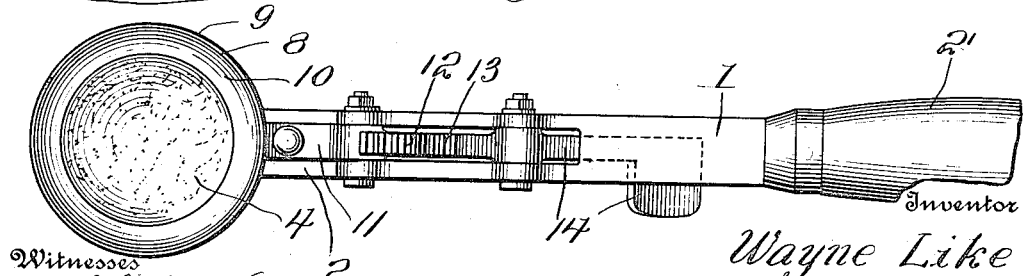

UNITED STATES PATENT OFFICE.

WAYNE LIKE, OF PLAINWELL, MICHIGAN.

ICE-CREAM-CONE FILLER.

1,204,167.

Specification of Letters Patent.   Patented Nov. 7, 1916.

Application filed November 13, 1915.   Serial No. 61,342.

*To all whom it may concern:*

Be it known that I, WAYNE LIKE, a citizen of the United States, residing at Plainwell, in the county of Allegan and State of Michigan, have invented new and useful Improvements in Ice-Cream-Cone Fillers, of which the following is a specification.

My invention relates to ice cream dippers, and has particular application to a dipper for filling ice cream cones.

The principal object of my invention is to provide an ice cream cone filler whereby the cone may be easily and quickly filled, the holder being so constructed as to lock the cone within the holder and thoroughly protect the same during the filling operation.

Another object of my invention is to provide an ice cream cone filler which is of such a construction as to facilitate the removal of the cone from the holder after the former has been filled.

With the above and other objects in view the invention consists in the construction, combination and arrangement of parts hereinafter described and claimed, reference being had to the accompanying drawing, in which:

Figure 1 is a side elevation of my device showing the locking cap in active position; Fig. 2 is a longitudinal section showing the locking cap in inactive position and the cone filled and ready for removal; and Fig. 3 is a top plan view of Fig. 1.

Referring to the drawings in detail, 1 designates a metal rod which has one end thereof provided with an offset portion 2 which is substantially L-shaped, the opposite end of the rod being provided with a handle 2'. Secured to the outer extremity of the offset portion 2 is my improved form of cone holder 3, which is formed of any suitable material, such as metal or the like and which is conical in shape, the cone being arranged in inverted position with relation to the rod 1. As shown in Fig. 2 the cone 4 is arranged within the holder, the holder being of a greater length than the ordinary cone so as to cause the upper edges of the cone to lie rearwardly of the upper edges of the holder. The lower end of the holder 3 has the end wall thereof provided with an opening which receives a plunger rod 5, the upper end of the rod extending into the holder and being provided with a frusto-conical cup 6, the opposite end being enlarged to provide a suitable bearing 6'.

Mounted within and surrounding the plunger rod 5 is a coiled contractile spring 7 which has one end thereof permanently secured to the cup 6, the opposite end being secured to the end wall of the holder. This spring 7 exerts tension to normally draw the cup toward the small end of the holder and keep the plunger rod in projected position.

Mounted upon the upper edge of the holder 3 is a locking cap 8 which comprises an annular piece of metal bent upon itself to provide diverging side walls 9 and 10, between which the upper marginal edges of the cone 4 and holder 3 are adapted to lie when the locking cap is in locking position. These divergent side walls 9 and 10 are of such a width as to thoroughly protect the upper marginal edge of the cone against breaking during the filling operation. To relieve the cone from the influence of the locking cap I have provided mechanism for moving the cap outwardly and away from the holder. Pivotally secured to one side of the locking cap 8 is one extremity of a lever 11, the opposite extremity being provided with a sector gear 12, the rod being fulcrumed to the vertical arm of the offset L-shaped portion. Pivotally mounted upon the rod 1 at a point adjacent the offset portion 2 is a second gear 13 which is of a corresponding configuration to that of the sector gear 12 and is adapted to mesh with the latter. Secured to the sector gear 13 at its pivotal point is a rearwardly extending operating handle 14 which terminates at a point forward of the handle 2' so as to permit the operator to actuate the operating handle while gripping the handle 2'. To cause the locking cap to return to its locked position after having been moved outwardly, I have provided the lever 11 with a coiled contractile spring 15 which has one end secured thereto, the opposite end being secured to the horizontal arm of the offset portion 2.

It will be seen from the foregoing construction that when it is desired to fill the cone, the cone is placed within the holder so as to cause the small end thereof to lie within the cup 6, and the device is then inserted into the container and the cone filled in the usual manner, the cap preventing the upper marginal edges of the cone from being broken during the operation and also serving to lock the cone within the holder. When it is desired to remove the cone from the holder the locking cap is moved outwardly away from the top of the holder by gripping the operating handle 14 and moving it upwardly toward the rod 2, thereby actuating the sector gear and removing the cap from the holder against the tension of the coil spring 15, the spring serving to return the locking cap to its normal position when the operating lever is released and preventing the cap from being broken or displaced. The cone is then removed from the holder by moving the plunger rod forwardly against the tension of the coiled spring, thereby causing the cup to push the cone a suitable distance out of the holder so as to permit the cone to be gripped and removed. Upon relieving the plunger of pressure the coiled spring will cause the plunger and cup to return to their normal positions. It will thus be seen that the cone may be filled quickly and without exposing the same, whereby the breaking or destroying of the cone will be prevented.

It is thought from the foregoing, taken in connection with the accompanying drawings, that the construction and operation of my device will be clearly understood without further description, and that slight changes in size, proportion and minor details of construction may be made without departing from the spirit and scope of the claims appended hereto.

Having thus described my invention, I claim:

1. An ice cream cone filler comprising a conical holder adapted to receive the cone, means for locking said cone within the holder, a plunger rod slidably mounted in the lower end of said holder and projecting beyond the said lower end, a cup formed on one end of said rod and lying within said holder, and a contractile spring mounted on said plunger rod within said holder and having one end thereof secured to said cup, the remaining end being secured to said holder, whereby the rod will be projected from the holder.

2. An ice cream cone filler comprising a rod having one end thereof bent at right angles to provide an off set portion, a cone holder secured to the free extremity of said off set portion, a lever pivotally mounted upon said rod at its juncture with off set portion, a locking cap formed on the outer end of said lever and adapted to engage said holder, a contractile spring having one extremity thereof secured to said off set portion, the opposite extremity being secured to said lever, a sector gear formed on the opposite end of said lever, a second sector gear pivotally mounted on said rod and meshing with the first mentioned gear, and a handle formed on the last mentioned gear.

In testimony whereof I affix my signature in presence of two witnesses.

WAYNE LIKE.

Witnesses:
M. VANDER MAAS,
F. P. HEATH.